United States Patent Office 3,591,627
Patented July 6, 1971

3,591,627
OIL-SOLUBLE SULFONATE PREPARATION WITH NOVEL SEPARATION STEP
Ulric B. Bray, Los Angeles, and Lemuel S. Benbury, Whittier, Calif., assignors to Bray Oil Company, Los Angeles, Calif.
No Drawing. Filed July 7, 1967, Ser. No. 651,695
Int. Cl. C07c 143/24
U.S. Cl. 260—505S
9 Claims

ABSTRACT OF THE DISCLOSURE

Oil soluble sulfonates suitable for lubricating oil additives etc. are made substantially free of corrosive sulfates by controlled addition of water to alkyl benzene sulfonic acids in solution in a hydrocarbon solvent, thereby separating a major part of the associated sulfuric acid, then neutralizing with excess powdered metal oxide, hydroxide or carbonate and filtering to remove the excess solids on which are adsorbed remaining sulfates.

---

This invention relates to the sulfonation of hydrocarbons for manufacture of oil soluble sulfonates of metals of Group I and Group II useful in compounding lubricating oils, jet engine oils, hydraulic oils, and rust protection compounds. More particularly, the invention relates to sulfonation of benzene alkylates of higher molecular weight obtained in the alkylation of benzene with linear olefines or monochlor hydrocarbons of straight chain structure. Most desirable hydrocarbons have one benzene ring to which is attached hydrocarbon groups, preferably one or more alkyl groups sufficient to provide from about 24 to 42 carbon atoms in the molecule. The "alkylate" is preferably diluted before or after sulfonation with a suitable low viscosity lubricating oil such as a neutral oil of about 100 to 300 SSU viscosity at 100° F. An acid refined neutral oil of 150 viscosity is quite satisfactory for most purposes. Also for most purposes, it is desirable to dilute the alkylate before sulfonation with about 40 to 60% by volume of the neutral oil so that the final sulfonation product will contain about 40% active sulfonate in solution in hydrocarbon oil. Sulfonation is effected by intimately mixing the oil with oleum, usually containing 15 to 30% $SO_3$, an oleum of 25% $SO_3$ being quite satisfactory.

One object of the invention is to produce an oil soluble sulfonate of a metal of Groups I and II of the periodic system, which is substantially free of chlorides and exceptionally low in sulfates which would render the product unsuitable for use in anti-corrosion and rust protection oils. Another object of the invention is to produce a polyvalent metal sulfonate which will dissolve in oils to give clear, transparent solutions free of haze or objectionable cloud and of yellow or light red color. Still another object of the invention is to provide a process for making oil soluble sulfonates of calcium or barium by direct neutralization of a sulfonic-sulfuric acid mixture with lime or baryta with formation of sulfonates in which contaminating sulfates of barium, calcium, or other Group II metal, have a crystal structure which will permit their removal from the sulfonate solution by filtration at an economically rapid rate.

It has heretofore been common practice in making sulfonates of 400 to 600 molecular weight to first separate a sludge from the sulfonated oil by settling, the separation of sludge being facilitated by dilution of the sulfonated oil ("acid oil") with a hydrocarbon solvent, either aromatic or paraffiic (U.S. 2,166,117; 2,732,344). The acid oil is then neutralized with caustic soda to form the sodium sulfonate. Sulfuric acid, which is always associated with the sulfonic acids, is thereby converted to sodium sulfate which, being highly water soluble, can be removed by water washing in the presence of emulsion breaking solvents, one of the best being butyl alcohol (U.S. 2,453,690; 2,689,221; 2,781,315; 2,781,316; 2,781,317). The purified sodium sulfonate is then converted to polyvalent metal sulfonate, usually barium or calcium sulfonate, by double decomposition with the corresponding salt of the polyvalent metal, usually the chloride, followed by water washing to remove the excess chloride. However, even extensive washing cannot remove all the chloride and, at the very best traces of chloride remain in the polyvalent metal sulfonate oil. For many uses, particularly for use in corrosion preventive oils and hydraulic oils, even these traces are quite objectionable owing to the strong electrolytic action of the chlorides. Thus, it has been difficult to prepare oils which will pass the "clip test" or "corrosivity test" (Federal Test Method 791a, #5322) when traces of chlorides are present.

It has been proposed to neutralize the acid oil comprised of sulfonic acids and associated sulfuric acid and sulfur dioxide, directly with lime or baryta (U.S. 2,585,520), thus avoiding the use of chlorides entirely. However, when this procedure was followed with the linear alkylates, sulfuric acid and $SO_2$ were converted to insoluble sulfates and sulfites of calcium or barium which are almost impossible to separate from the sulfonate-oil solution because they are present as colloidal dispersions, stabilized by the strongly surface-active linear sulfonates. Attempts to filter such oils have failed, owing to the low filter rates encountered and the excessive consumption of filter aid such as Filter-Cel, Hy-Flo, or Dicalite—brand names of diatomaceous earth. Even when filtered, the oil is hazy or cloudy with appearance seriously impaired.

We have now discovered a method by which sulfonic acids made by treatment of linear alkyl benzene hydrocarbons can be neutralized directly with a base of the desired metal, e.g. with Group II metal base, such as calcium or barium hydroxide or carbonate, without encountering the difficulties hereinabove described. We have found that these difficulties can be avoided by removing acid sludge from the sulfonation product in two stages, first separating sludge from the sulfonic acids in solution in lubricating oil only by taking advantage of the difference in density, then, in a second stage, separating remaining sludge from a dilute solution of the sulfonic acids in a volatile hydrocarbon solvent. A small amount of water can be added in the second stage, e.g., about 1% of the volume of oil charged, but it is preferred to avoid all water addition until the sludge precipitated in the second stage has been removed, as will be shown hereinafter. The amount of solvent required is about 1 to 3 volumes, per volume of acid oil, generally 1½ to 2 volumes.

After second stage sludge separation, a controlled amount of water is introduced to the solvent-acid oil solution—about 10 to 20 percent of the volume of alkylate-neutral oil charged to the sulfonation. The amount of water used should be sufficient to saturate the oil solution and give a water layer. After thorough mixing and settling, a dilute sulfuric acid layer is discarded and the acid oil-solvent solution is then neutralized with an excess of lime, baryta, or other Group II metal base. The alkali should be added in the form of a dry powder inasmuch as the water which is held in colloidal solution in the oil is quite sufficient to solvate the alkali for effecting neutralization of the sulfonic and sulfuric acids. The fine particles of the base adsorb on their surface, insoluble salts. Calcium hydroxide, barium carbonate, or magnesium oxide are conveniently used in powder form, employing an excess of about 25 to 75% of theory. Although of less importance, sodium, potassium, or lithium carbonates can be used in powder form to produce the corresponding alkali metal sulfonates. Mixing at a temperature of 150 to 180° F. is desirable, and addition of a small quantity of a lower alcohol, e.g. of 1 to 5 carbons, such as methanol or propanol, will speed the neutralization by improving contact between the phases. Less than 1% by weight, based on the oil charged to sulfonation, is effective.

Under these conditions, the sulfate, e.g., calcium or barium sulfate, formed from neutralization of the sulfuric acid present is found to possess a unique crystal structure which facilitates removal from the oil-sulfonate-solvent solution by settling or filtration. Most of the sulfate can be settled by gravity or by centrifuge from the solvent-sulfonate oil solution, along with excess lime, but we prefer to filter the solution directly. Usually no filter aid is required but we may use about 1 to 3 percent of a diatomaceous earth filter aid such as "Hy-Flo" of the Johns Manville Company. The free filtering character of the slurry suggests use of a continuous rotary filter where the cake can be washed with a hydrocarbon solvent spray before discarding. Operating in this manner in the absence of a separate aqueous phase, we avoid formation of emulsions which have heretofore served to disperse the excess lime and calcium sulfate, forming unfilterable mixtures. we believe the metal sulfates and sulfites form crystals on the surface or within the particles of the powdered metal base used in neutralization, possibly forming basic salts therewith. This theory is supported by the fact that a substantial excess of the base is needed to effect neutralization of the acid oil—usually at least 50 percent excess. The base should be sufficiently fine to pass 100 mesh with a substantial proportion passing 200 and 300 mesh.

The clear filtrate from the filtration step is stripped free of solvent, preferably in a pipe still, the solvent being recovered and dried for re-use in the process. Solvent stripping can be aided by injecting steam, later recovered as a water layer. The oil product, containing preferably about 40% active sulfonate, can be given a final "polish" filtration, suitably in a plate and frame filter press. It is bright and clear, free from haze, and of a yellow or light red color with an alkali value, usually in the range of 1 to 5 mg. KOH per gram equivalent, depending on the time of contact and amount of excess lime employed in neutralization.

We have found that if the solvent is used in the first sludge separation stage, separation of sludge is facilitated but the oil product obtained is hazy and often almost impossible to filter after neutralization. The reason for this anomalous behavior is not apparent, but we suspect that the sludge phase which separates from the undiluted oil immediately after sulfonation possesses a unique solvent power for certain substances, possibly polynuclear sulfonic acids, which otherwise migrate to the oil phase when volatile solvent is present. Therefore, removal of sludge from undiluted acid oil serves to eliminate these substances and avoid their disturbing effect on the sulfates formed on neutralization.

Linear alkyl benzene suitable for sulfonation in our process is preferably made by treating benzene with straight chain olefines or mono chlor hydrocarbons in a Friedel Crafts reaction with anhydrous $AlCl_3$ catalyst. Other Friedel Crafts catalysts such as $BF_3$ can be used to effect alkylation of the benzene. We prefer to employ alphachlor straight chain hydrocarbons of about 11 to 13 carbon atoms and to separate the alkylation product by distillation into light, medium, and heavy residual fractions. The light fraction boiling in the range of 510–570° F., having about 15 to 18 carbon atoms, is suitable for sulfonation to make water soluble sodium salts useful as household detergents. The heavy fraction of about 24 to 42 carbon atoms is most desirable for our process. It may be given a preliminary refining with sulfuric acid or extraction with a selective solvent such as furfural, to remove polynuclear aromatics formed by the condensing action of the aluminum chloride catalyst. Diphenyl alkanes and Tetralins are particularly undesirable, tending to form excessive amounts of sludge when sulfonated.

The linear hydrocarbons employed in alkylation of benzene may be obtained by cracking or dehydrogenating paraffin wax or by the selective action of a "molecular sieve" on a heavy naptha or kerosene fraction of a paraffinic crude petroleum. Such "molecular sieves" are well known as alumino silicates prepared from gels with controlled pore dimensions, permitting only straight chain hydrocarbons to be absorbed. Type "5A" absorbent made by the Union Carbide Company is effective. Urea crystals can also be used for the purpose.

The paraffin fraction of 11 to 13 carbon atoms from the molecular sieve, boiling about 340–450° F., is chlorinated to give a mono chloride from which dichloride by-products are eliminated by fractionation. Alkylation of about 2–5 mols benzene per mol of paraffin chloride, using aluminum chloride catalyst, yields an alkylate from which the desired heavy fraction is recovered by distillation as above indicated. A typical fraction may give the following ASTM distillation test:

5% over at 681° F.
50% over at 711° F.
90% over at 747° F.
95% over at 760° F.

The heavy linear alkylates are not entirely alkyl benzene compounds but, owing to the condensing action of the Friedel crafts catalyst, there is formed a number of polynuclear hydrocarbons. Spectrographic analysis has revealed indanes, naphthalene derivatives, biphenyls, alkyl anthracene, and acenapthylene. A typical analysis by low voltage mass spectograph is shown in the table:

MASS SPECTROGRAPH ANALYSIS OF HEAVY ALKYLATE FRACTION

| Number of carbon atoms | Weight percent | | | | | | | |
|---|---|---|---|---|---|---|---|---|
| | $C_nH_{2n-6}$ | $C_nH_{2n-8}$ | $C_nH_{2n-10}$ | $C_nH_{2n-12}$ | $C_nH_{2n-14}$ | $C_nH_{2n-16}$ | $C_nH_{2n-18}$ | Total |
| 11–24 | 4.2640 | 2.1451 | .9458 | .9096 | 3.6236 | .9425 | .5355 | 13.3563 |
| 25 | .5945 | .3085 | .1686 | .3260 | 1.4710 | .2766 | .1495 | 3.3547 |
| 26 | 1.4943 | .5784 | .2061 | .4402 | 1.3473 | .2546 | .1541 | 4.4750 |
| 27 | 4.7082 | 1.1454 | .3260 | .6636 | 1.1039 | .2652 | .1650 | 8.3773 |
| 28 | 10.0823 | 1.9794 | .4804 | .9431 | 1.2325 | .3186 | .1747 | 15.2110 |
| 29 | 12.9535 | 2.2811 | .5254 | .9329 | 1.0765 | .3252 | .1755 | 18.2701 |
| 30 | 13.0957 | 1.9605 | .4326 | .7705 | .8773 | .2457 | .1400 | 17.5223 |
| 31 | 5.0208 | .7349 | .1927 | .3175 | .4243 | .1613 | .0851 | 6.9366 |
| 32 | 1.5750 | .2789 | .0928 | .1472 | .4510 | .1376 | .0728 | 2.7556 |
| 33 | .6469 | .1459 | .0682 | .1030 | .7579 | .1508 | .0608 | 1.9407 |
| 34 | .6613 | .1395 | .0584 | .1074 | 1.1375 | .2075 | .0663 | 2.3779 |
| 35 | .3895 | .0994 | .0400 | .0599 | 1.2372 | .1950 | .0664 | 2.0874 |
| 36 | .2291 | .0727 | .0290 | .0424 | 1.0347 | .1739 | .0535 | 1.6353 |
| 37 | .2223 | .0730 | .0278 | .0351 | .4340 | .0845 | .0364 | .9131 |
| 38 | .2591 | .0553 | .0250 | .0252 | .1831 | .0463 | .0178 | .6118 |
| 39 | .0000 | .0000 | .0000 | .0244 | .0966 | .0338 | .0209 | .1757 |
| Total | 56.1867 | 12.0580 | 3.6188 | 5.8480 | 16.4884 | 3.8263 | 1.0743 | 100.0000 |
| Type | Alkyl benzene | Alkyl indane | Alkyl indene | Alkyl naphthalene | Alkyl biphenyl | Alkyl acenapthylene | Alkyl anthracene | |

On sulfonation, the polynuclear constituents react extensively with the $SO_3$ to produce heavy, dark colored bodies which we call "sludge." We prefer to remove as much of the polynuclear aromatics as economically feasible by extraction with selective solvents such as furfural, phenol, etc., and/or treatment with sulfuric acid of 95 to 100% concentration.

EXAMPLE 1

The following example will show the results obtained when linear alkylate is sulfonated with 25% oleum. The alkylate is first blended with an acid refined neutral oil having the characteristics shown in the following table:

|  | Neutral oil | Alkylate |
|---|---|---|
| Gravity, °API | 33.0 | 25.1 |
| Viscosity, SSU: |  |  |
| 100° F | 102.7 | 187.4 |
| 210° F | 39.6 | 44.9 |
| Viscosity index | 98 | 87 |
| Flash,° F | 405 | 430 |
| Fire | 440 | 475 |
| Pour point, ASTM,° F | −10 | −55 |
| Aniline point,° F | 216 | 130 |

To 1000 cc. (875 grams) of a blend of the above oils (450 cc. neutral and 550 cc. alkylate), there was added gradually in a closed, stirred reaction flask, 330 cc. oleum (25% $SO_3$) at the rate of approximately 10 cc. per minute, as follows:

|  | Temperature,°F. | Oleum, cc. |
|---|---|---|
| Start | 68 | 0. |
| Minutes: |  |  |
| 3 | 98.5 | 55. |
| 7 | 106 | Cooling applied. |
| 10 | 107.4 | 100. |
| 15 | 108.2 | 145. |
| 20 | 108 | 190. |
| 25 | 107.5 | 240. |
| 30 | 107.4 | 280. |
| 38 | 106.5 | 330. |
| 58 | 102 | Terminated. |

The reaction product was settled overnight in a stoppered glass funnel at about 80° F. Sludge layer was then drawn from the bottom. Analysis of the sludge by titration indicated an acidity of 65% $H_2SO_4$. However, this corresponds to an acid of much higher strength, inasmuch as the diluent is largely organic matter, not water.

Sludge: 535 cc. (781 gm.); 1.46 specific gravity
Oil layer: 755 cc. (692 gm.); acid value—99

The oil was diluted with about two volumes (1510 cc.) of naphtha commonly known as Varnish Makers and Painters Naphtha—V.M. and P., previously treated with fuming sulfuric acid to insure no sulfonatable constituents. After settling two hours, there had settled 13 cc. (17 grm.) of sludge (1.31 specific gravity). To the brown, naptha solution (2235 cc.—acid value—22) was added 150 cc. water with thorough mixing. The color instantly lightened to a straw color. After settling five hours, the dilute acid layer—66 cc. (147 acid value) was drawn off. The naphtha solution titrated 17.5 acid value. It was neutralized with powered, dry lime—45.2 gm. equal to 170% of theory—by agitating and heating to 142° F. Titration showed an alkali value of 0.3 with phenolphthalein indicator and 1.7 with methyl orange. It was rapidly filtered free of solids, without need of filter aid, using a suction filter and ordinary Whatman No. 2 paper.

The filtrate was stripped free of naptha by distillation, introducing steam to aid in removing the last part of the naphtha solvent. A temperature of 300° F. was adequate. The product was a clear oil having the characteristics shown in the following table. For comparison, data are included from sulfonation of the same stock at the same conditions with the exception that the V.M.P. solvent was added in the *first* stage of sludge separation.

|  | Solvent in— | |
|---|---|---|
|  | First stage | Second stage |
| Alkali value, mg. KOH/gm | 9.1 | 1.9 |
| Ash—sulfated, percent | 6.83 | 5.34 |
| Neutral ash, calculated | 5.72 | 5.11 |
| Calcium—calculated, percent |  | 1.57 |
| Calcium, determined |  | 1.55 |
| QAS calcium | 1.49 | 1.43 |
| Sulfate (as $Na_2SO_4$), percent | 0.157 | 0.048 |
| Color—ASTM, diluted | L2.5 Hazy | L2.5 Clear |

Note the high sulfate in the first example and hazy appearance.

The QAS calcium is determined by the quaternary ammonium sulfonate method employing a solution of hyamine hydrochloride or cetyl pyridinium bromide as described in the paper by House, et al., Analytical Chemistry, Vol. 26, September 1954, pages 1492–97, and also in Technical Bulletin of Rohm and Haas Company, February 1960, "Assay of Hyamine Products." The result is expressed as the equivalent percent calcium. The alkali (or acid) value can be determined by ASTM Method D664–58 and is expressed in milligrams KOH equivalent per gram of sample. The ash was determined by igniting a weighed sample and sulfating in accord with ASTM Method D874–59T.

The volatile hydrocarbon solvent used in the second sludge separation stage of our process should boil within the range of about 250°–350° F. for most convenient operation. Lower boiling solvents such as hexane and benzene can be used but contribute to high solvent losses by evaporation and increased fire hazard. Higher boiling solvents are more difficult to remove from the sulfonate product, we can also use an aromatic solvent such as xylene fer to use a paraffinic solvent which gives a lighter colored product, we can also use an aromatic solvent such as eylene or an aromatic fraction from aromatization of petroleum naphtha. A suitable aromatic solvent is marketed by the American Mineral Spirits Company and designated "Solvent Naphtha B." Chevron Chemical Company also makes a petroleum xylene. As stated herein above, we prefer to use a petroleum naphtha fraction known as V.M. and P. A comparison of these two solvents is shown in the following table:

|  | V.M. and P. (not pretreated) | Solvent B |
|---|---|---|
| Gravity, °API | 52.6 | 32.9 |
| Aromatics, percent | 10 | 92 |
| Kauri—butanol No. (ASTM D 1133) | 37 | 93.8 |
| Initial boiling point, ° F | 252 | 274 |
| 50% point | 268 | 275 |
| 90% point | 286 | 275 |
| End point | 301 | 278 |

A charge of 550 cc. of linear alkylate and 450 cc. of neutral oil was sulfonated with 330 cc. of oleum as described hereinabove. Sludge was settled overnight and drawn off to discard (518 cc.). The acid oil, yield—780 cc., acid value—97, was divided into two equal portions. One portion was dissolved in 770 cc. aromatic solvent and the other in 770 cc. paraffinic solvent V.M. and P. and settled four hours after which sludge was drawn off as follows:

|  | Aromatic solvent | V.M. and P |
|---|---|---|
| Volume of sludge, cc | 5 | 7 |
| Acid value of oil | 21.2 | 23.4 |
| Volume of oil, cc | 1,145 | 1,150 |
| Water added to oil, cc | 58 | 58 |
| Settled overnight: |  |  |
| Water layer, cc | [1]16 | 19.5 |
| Acid value of water layer | 117 | 183 |
| Acid value of oil layer | 19.6 | 17.6 |
| Neutralized with Ca(OH)₂, grams | 31 | 28.25 |
| Alkali value of oil | 1.2 | 1.4 |
| Filtered solution (no filter aid) rate | Good | Slower |
| Stripped solvent—320° F. with steam—oil yield, grams | 323 | 313 |
| Refiltered with 2% Hy-Flo | ([2]) | ([2]) |
| Tests of oil: |  |  |
| Alkali value | 5.4 | 5.8 |
| Ash—sulfated, percent | 5.70 | 5.97 |
| QAS calcium, percent | 1.49 | 1.43 |
| Sulfate as Na₂SO₄ | .034 | .035 |
| Color, ASTM | 8 | L6 |
| Viscosity: |  |  |
| Centistokes | 14.8 | 12.8 |
| Saybolt Universal | 77.16 | 69.5 |
| Yield of sulfonate, grams | 332 | 322 |

[1] Yellow.
[2] Bright, clear.

These data show a modest improvement in color for the paraffinic solvent in comparison with the aromatic solvent, whereas the sulfate removal was substantially identical and remarkably low.

EXAMPLE 3—BARIUM SULFONATE

Following are the results obtained when neutralizing the linear alkyl sulfonic acid with barium carbonate in finely powdered form. The alkylate was sulfonated as described hereinabove, starting with a blend with 45% by volume of neutral oil No. 130 and treating with 60% by volume of oleum. The alkylate used was derived from linear hydrocarbons separated from a petroleum fraction with a molecular sieve, chlorinated and condensed with benzene. The yield on sulfonation was 90% of acid oil and 166 acid value, based on the volume of the blend. It was diluted with two volumes of V.M. and P. naphtha and settled 2.5 hours. A sludge layer of 50 cc. was removed, testing 61% $H_2SO_4$. To the naphtha solution was added 5% by volume of water, and an aqueous layer of 40 cc. was settled out after thorough mixing.

The naphtha solution was divided into two equal portions. One portion was neutralized with powdered barium carbonate—83 gm., about 50% excess of the theory, followed by 5 cc. of a 20% solution of barium oxide. It was filtered on a suction filter without filter aid at a moderate rate. The other portion was neutralized with an aqueous solution of 66 gm. barium oxide and filtered to remove barium sulfate and excess barium hydroxide. The filter rate was slower than when the carbonate was used, and a water layer separated in the filtrate receiver.

Solvent was stripped from both portions with steam at 320–330° F. and the sulfonate products were refiltered with results which follow:

| Base employed | BaCO₃, powder | Ba(OH)₂, solution |
|---|---|---|
| Hy-Flo filter aid used in final filtration, percent | 2 | 5 |
| Filter tate | ([1]) | ([2]) |
| Ash—sulfated, percent | 14.17 | 14.85 |
| Alkali value | 2.8 | 5.2 |
| QAS barium, percent | 6.60 | 6.63 |
| Color | Clear | ([3]) |
| Sulfate | Nil | Nil |

[1] Slow steady.
[2] Filter quickly plugged with 2% aid.
[3] Slight haze.

These results show the advantage of using a finely divided form of barium base for neutralizing acid oil, instead of a solution which forms a colloidal dispersion of barium sulfate, peptized by linear alkyl sulfonate.

EXAMPLE 4—MAGNESIUM SULFONATE

The heavy residue from linear alkyl benzene described hereinabove was sulfonated in admixture with 45% (volume) with 130 neutral oil. One liter of the mixture was treated with 330 cc. of oleum (60% of the alkylate) added gradually over 40 minutes with cooling to prevent a rise in temperature above 110° F. After settling out sludge overnight, 900 cc. acid oil was recovered and diluted with 1800 cc. V.M. and P. solvent. From the solution was settled 47 cc. more sludge. To the solution (2650 cc.) was added 5% by volume of water (133 cc.) after which 47 cc. of acid was drawn off having an acid value of 357. The oil solution was then neutralized with 34.3 gm. magnesium oxide powder which represents an excess of 50% above theory required. Mixing for 1½ hours at 140° F. was sufficient. The solution was filtered rapidly on a suction funnel without filter aid. Two grams more of magnesium oxide was added before stripping solvent with steam at 340° F. The hot oil was then refiltered rapidly using 2% by weight of Hy-Flo filter aid to insure clarity. The clear, bright magnesium sulfonate-oil product gave the following analysis:

Ash—sulfated: 7.37%
Alkali value, phenolphthalein: 0.6
Alkali value, methyl orange: 4.9
Magnesium, QAS: 1.25%
Color—undiluted: L6
Color—diluted: L2

Although we have described our process as it is particularly applied to sulfonation of linear alkyl benzene hydrocarbons, it can also be applied to non-linear alkylates such as are obtained by alkylation of benzene with poly propylene, poly butene, etc., of high molecular weight as well known in the art.

Having thus described our invention, what we claim is:

1. The process of making oil soluble sulfonates of alkali and alkaline earth metals which comprises the following steps: (1) reacting with oleum, an alkyl benzene hydrocarbon having about 24 to 40 carbon atoms in solution in a hydrocarbon lubricating oil, thereby producing a preferentially oil soluble alkyl benzene sulfonic acid and an oil insoluble sludge; (2) separating the sludge phase from the oil-sulfonic acid phase by the difference in their densities; (3) diluting the sulfonic acid phase with at least an equal volume of a volatile hydrocarbon solvent; (4) separating a second sludge phase from the solution of sulfonic acid in the solvent; (5) mixing the solution with a controlled amount of water equal to about 10 to 20 percent of the volume of the oil charged to the oleum reaction; (6) separating an aqueous acid phase from the sulfonic acid solution; (7) neutralizing the acid solution by mixing with an excess of a basic compound of a metal selected from the class consisting of the alkali and alkaline earth metals in the form of a fine powder, thereby forming oil soluble sulfonate of the metal and insoluble metal sulfate adsorbed on the particles of said basic compound; (8) filtering the solution to remove excess base and adsorbed sulfate; (9) distilling hydrocarbon solvent from the clear filtered solution.

2. The process of claim 1 wherein the basic metal compound is selected from the class consisting of the oxides, hydroxides, and carbonates of the metals of Group II of the Periodic System of elements.

3. The process of claim 2 wherein the basic metal compound is calcium hydrate.

4. The process of claim 1 wherein the hydrocarbon solvent of step (3) is a praffinic type naphtha having a boiling range corresponding approximately to that of varnish makers and painter's naphtha.

5. The process of claim 1 wherein the alkyl benzene hydrocarbon of step (1) is a mono nuclear alkyl benzene in which the alkyl substituents have a structure which is essentially linear.

6. The process of claim 5 wherein the said alkyl benzene hydrocarbon is a higher boiling fraction resulting from the alkylation of benzene with a linear hydrocarbon of 11 to 13 carbon atoms in the presence of a Friedel Crafts catalyst and distillation of the reaction product.

7. The process of claim 1 wherein the lubricating oil employed in step (1) is a neutral oil of about 100 to 300 SSU viscosity at 100° F., essentially free of sulfonatable constituents.

8. The process of claim 1 wherein the amount of water added in step (5) is sufficient to saturate the hydrocarbon solution and give a separate aqueous acid phase, but is less than 20 percent by volume of the solution.

9. The process of claim 1 wherein the basic metal compound employed in step (7) is in excess of that theoretically required by an amount of about 25% to 75%.

References Cited
UNITED STATES PATENTS

| | | | |
|---|---|---|---|
| 3,007,868 | 11/1961 | Eck et al. | 252—33 |
| 2,882,301 | 4/1959 | Sias et al. | 260—505S |
| 2,573,675 | 11/1951 | Bloch et al. | 260—505S |
| 2,820,056 | 1/1958 | Gerhart et al. | 260—505P |
| 2,514,733 | 7/1950 | Vold et al. | 260—505SX |
| 3,476,800 | 11/1969 | Cease | 260—505S |

BERNARD HELFIN, Primary Examiner

L. DE CRESCENTE, Assistant Examiner

UNITED STATES PATENT OFFICE
CERTIFICATE OF CORRECTION

Patent No. 3,591,627     Dated July 6, 1971

Inventor(s) Ulric B. Bray et al.

It is certified that error appears in the above-identified patent and that said Letters Patent are hereby corrected as shown below:

Column 4, in the Table at bottom of the page, in the column headed "$C_nH_{2n}-16$" line 10, ".1508" should read -- .1580 --. Column 6, line 42, beginning with "Higher boiling" cancel all to and including "naptha." in line 47, and insert instead -- Higher boiling solvents are more difficult to remove from the sulfonate product without costly vacuum stripping. Although we prefer to use a paraffinic solvent which gives a lighter colored product, we can also use an aromatic solvent such as xylene or an aromatic fraction from aromatization of petroleum naptha. --; line 69, insert as a heading -- EXAMPLE 2 --. Column 7, line 42, "oil and 166 acid value" should read -- oil of 166 acid value --; line 64, "Filter tate" should read -- Filter rate --.

Signed and sealed this 22nd day of February 1972.

(SEAL)
Attest:

EDWARD M. FLETCHER, JR.
Attesting Officer

ROBERT GOTTSCHALK
Commissioner of Patents